(12) United States Patent
Guttman et al.

(10) Patent No.: US 12,192,881 B2
(45) Date of Patent: Jan. 7, 2025

(54) IN AND RELATING TO DISASTER INBOUND ROAMERS IN A TELECOMMUNICATION NETWORK

(71) Applicant: Samsung Electronics Co., Ltd., Suwon-si (KR)

(72) Inventors: Erik Guttman, Staines (GB); Kundan Tiwari, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 173 days.

(21) Appl. No.: 17/629,630

(22) PCT Filed: Jul. 24, 2020

(86) PCT No.: PCT/KR2020/009820
§ 371 (c)(1),
(2) Date: Jan. 24, 2022

(87) PCT Pub. No.: WO2021/015597
PCT Pub. Date: Jan. 28, 2021

(65) Prior Publication Data
US 2022/0248304 A1    Aug. 4, 2022

(30) Foreign Application Priority Data

Jul. 25, 2019  (IN) .............................. 201931030058
Jul. 21, 2020  (GB) ..................................... 2011268

(51) Int. Cl.
*H04W 48/06* (2009.01)
*H04W 4/90* (2018.01)
(Continued)

(52) U.S. Cl.
CPC .............. *H04W 48/06* (2013.01); *H04W 4/90* (2018.02); *H04W 8/06* (2013.01); *H04W 48/10* (2013.01)

(58) Field of Classification Search
CPC ......... H04W 4/90; H04W 8/06; H04W 48/10; H04W 48/14; H04W 60/04
(Continued)

(56) References Cited

U.S. PATENT DOCUMENTS 8,417,243 B2    4/2013  Miklos
2009/0137265 A1*  5/2009  Flore ................... H04W 40/248
                                                                455/525
(Continued)

FOREIGN PATENT DOCUMENTS

EP    2 445 244 A1    4/2012
EP    3 113 547 A1    1/2017
(Continued)

OTHER PUBLICATIONS

Extended European Search Report dated Jul. 10, 2023, issued in European Patent Application No. 20843836.6.
(Continued)

*Primary Examiner* — Maria El-Zoobi
(74) *Attorney, Agent, or Firm* — Jefferson IP Law, LLP (57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of operating a second telecommunication network to manage access of Disaster Inbound Roamers, DIR, from a first telecommunication network, to the second telecommunication network, comprising the step of: the second telecommunication network
(Continued)

broadcasting a message indicating to User Equipments, UEs, of the first telecommunications network that they are able to roam on the second telecommunication network.

8 Claims, 7 Drawing Sheets

(51) Int. Cl.
  *H04W 8/06* (2009.01)
  *H04W 48/10* (2009.01)
(58) Field of Classification Search
  USPC ............................................. 455/404.1
  See application file for complete search history.

(56) References Cited

U.S. PATENT DOCUMENTS

| | | | |
|---|---|---|---|
| 2017/0006536 A1 | 1/2017 | Baek et al. | |
| 2018/0063688 A1 | 3/2018 | Lindholm et al. | |
| 2019/0037436 A1* | 1/2019 | Wang | H04W 88/08 |
| 2022/0070814 A1* | 3/2022 | Chun | H04W 8/02 |

FOREIGN PATENT DOCUMENTS

| | | | | |
|---|---|---|---|---|
| WO | WO-2019122494 A1 * | 6/2019 | | H04W 28/02 |
| WO | 2020/141964 A1 | 7/2020 | | |
| WO | 2020-141965 A1 | 7/2020 | | |

OTHER PUBLICATIONS

3GPP; TSG SA; Study on Support for Minimization of Service Interruption (Release 17), 3GPP TR 22.831 V0.1.0, Jun. 21, 2019.
LG Electronics et al., Network reselection during disaster—Non-disaster area, S1-191422, 3GPP TSG-SA WG Meeting #86, Suzhou, China, May 13, 2019.
Samsung, FS_Mint 22831 P-CR: Disaster Begins and Ends Use Cases, S1-191108, 3GPP TSG-SA WG1 Meeting #86, Suzhou, China, Apr. 26, 2019.
Huawei, Use case on "backup" PLMN for international roamer, S1-191585, 3GPP TSG-SA WG1 Meeting #86, Suzhou, China, May 13, 2019.
3rd Generation Partnership Project; Technical Specification Group Services and System Aspects; Study on Support for Minimization of Service Interruption (Release 17), 3GPP TR 22.831 V0.1.0, Jun. 21, 2019.
International Search Report dated Oct. 26, 2020, issued in International Application No. PCT/KR2020/009820.
British Search Report dated Mar. 31, 2021, issued in British Application No. GB2011268.6.
European Office Action dated Nov. 25, 2024, issued in European Patent Application No. 20 843 836.6-1218.

* cited by examiner

IN AND RELATING TO DISASTER INBOUND ROAMERS IN A TELECOMMUNICATION NETWORK

TECHNICAL FIELD

The present invention relates to techniques associated with the management of roaming user equipments (UEs) in the event of at least a partial outage of a mobile telecommunication network (Public land mobile network, PLMN).

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

DISCLOSURE OF INVENTION

Technical Problem

In the context of the present application, the term "disaster" represents an outage or at least a partial outage in one telecommunication network, PLMN. In such a situation, it is desirable for a user from the network affected by the outage to be able to access one or more other networks which are operable in the area affected by the disaster.

An example of a disaster in the present context could include a natural disaster (for example, an earthquake or fire) or could be a simple case of part of a network suffering a malfunction. In such circumstances, a user registered with the affected network may be unable to access the network due to the unavailability of access equipment in that user's locality.

There are agreements between network operators and, where necessary, governments which allow for users from a first affected network to roam to a second unaffected network. However, there are issues associated with such arrangements which can affect the usability of the second network in such a situation. In particular, if multiple UEs from the first network attempt to register with the second network, then a congestion situation may arise in the second network which can adversely affect the services to subscribers of the second network.

Solution to Problem

According to the present invention there is provided an apparatus and method as set forth in the appended claims. Other features of the invention will be apparent from the dependent claims, and the description which follows.

According to a first aspect of the present invention, there is provided a method of operating a second telecommunication network to manage access of Disaster Inbound Roamers, DIR, from a first telecommunication network, to the second telecommunication network, comprising the step of: the second telecommunication network broadcasting a message indicating to User Equipments, UEs, of the first telecommunications network that they are able to roam on the second telecommunication network.

In an embodiment, the message broadcast is directed only to User Equipments registered with the first telecommunication network.

In an embodiment, an access identity is assigned to User Equipments attempting to access the second telecommunication network, such that the second telecommunication network is able to control a number of possible new entrants by means of a Unified Access Control, UAC, procedure.

In an embodiment, the second telecommunication network limits a number of DIRs such that it is not overwhelmed.

In an embodiment, the second telecommunication transmits a threshold value and any UE attempting to access the second network generates a random number and the UE only proceeds with access if the generated random number is lower than the transmitted threshold value.

In an embodiment, the second telecommunication network configures a network slice for use by DIRs from the first telecommunication network.

In an embodiment, a UE seeking to register with the second telecommunication network identifies itself with an identifier, DIRI, whereby, in the event of overload, the second telecommunication network is configured to reject some or all UEs so identified.

According to a second aspect of the present invention, there is provided a method of operating a User Equipment, UE, registered with a first telecommunication network, whereby the UE is operable to determine a disaster condition by losing contact with the first telecommunication network and receiving a message from a second telecommunication network indicating that roaming is possible on the second telecommunication network.

In an embodiment, the UE, in response to receiving message from a second telecommunication network indicating that roaming is possible on the second telecommunication network, attempts to register with the second telecommunication network.

In an embodiment, the UE remains connected to the second telecommunication network until it receives a message from the first telecommunication network indicative of the disaster condition ending.

According to a third aspect of the present invention, there is provided an apparatus for operating a second telecommunication network to manage access of Disaster Inbound Roamers, DIR, from a first telecommunication network, to the second telecommunication network, the apparatus comprising: a transceiver; and a controller configured to broadcast a message indicating to User Equipments, UEs, of the first telecommunications network that they are able to roam on the second telecommunication network.

In an embodiment, the apparatus is a core network entity or a base station.

According to a fourth aspect of the present invention, there is provided an apparatus registered with a first telecommunication network, the apparatus comprising: a transceiver; and a controller configured to determine a disaster condition by losing contact with the first telecommunication network and receiving a message from a second telecommunication network indicating that roaming is possible on the second telecommunication network.

In an embodiment, the apparatus is a User Equipment.

Although a few preferred embodiments of the present invention have been shown and described, it will be appreciated by those skilled in the art that various changes and modifications might be made without departing from the scope of the invention, as defined in the appended claims.

Advantageous Effects of Invention

It is an aim of embodiments of the present invention to address issues associated with the entry of such users, affected by the disaster, into the one or more other networks, particularly in such a way that users registered with the one or more other networks are not severely adversely affected by the ingress of multiple new users to their network.

MODE FOR THE INVENTION

Figure 1:
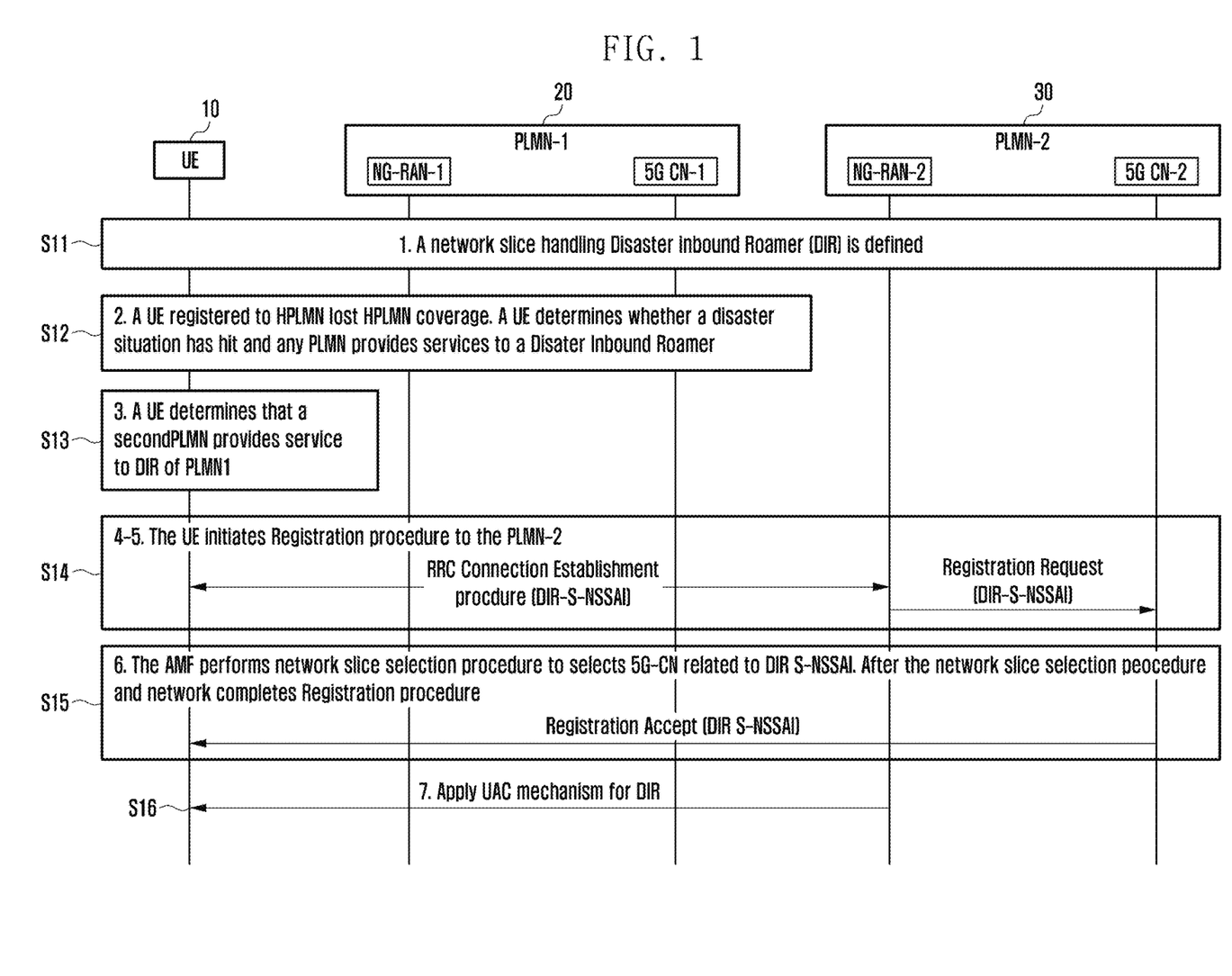
FIG. 1 illustrates a typical message exchange according to a first embodiment of the present invention. Here, a new network slice is defined for a disaster inbound roamer.
Figure 2:
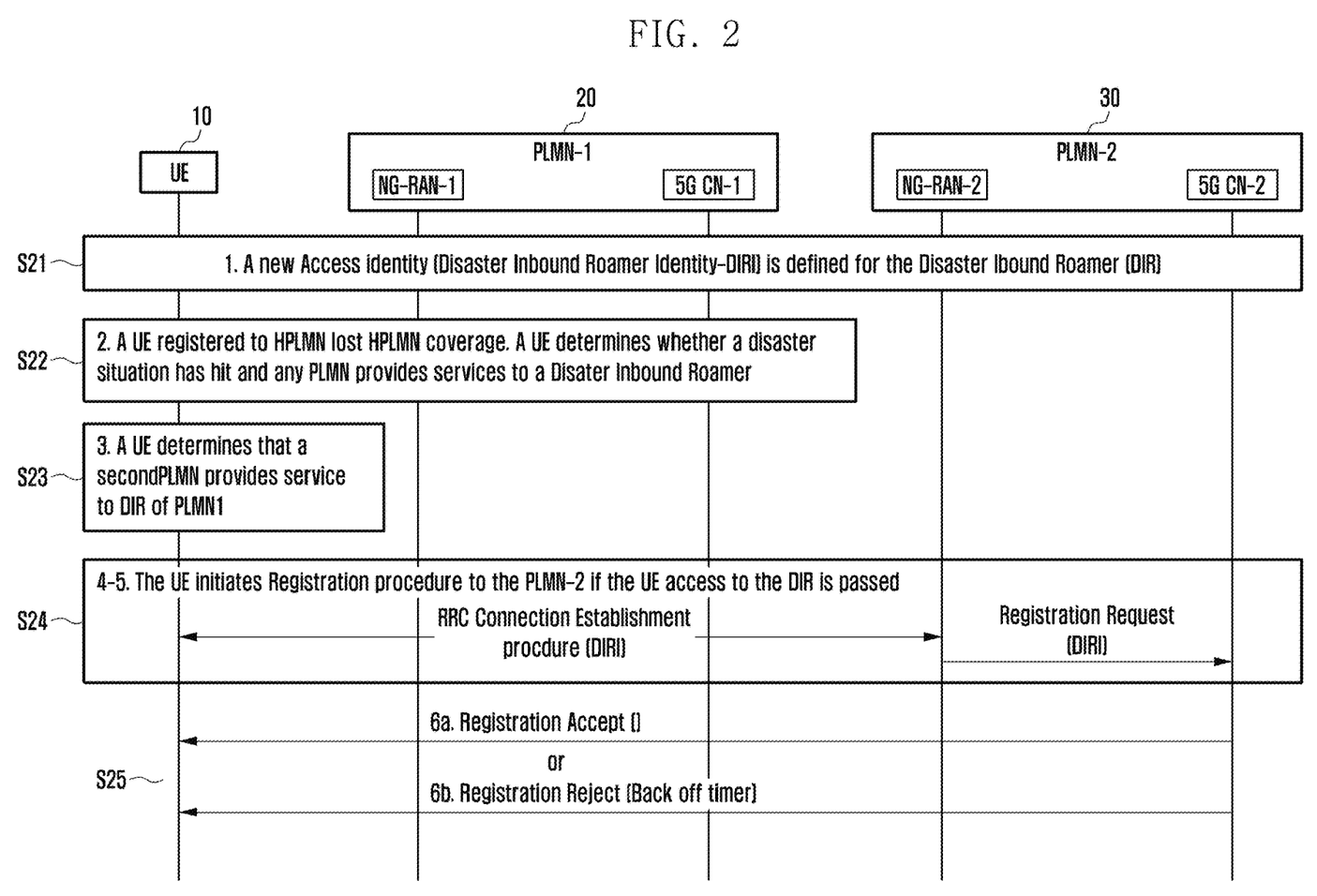
FIG. 2 illustrates a typical message exchange according to a second embodiment of the present invention.
Figure 3:
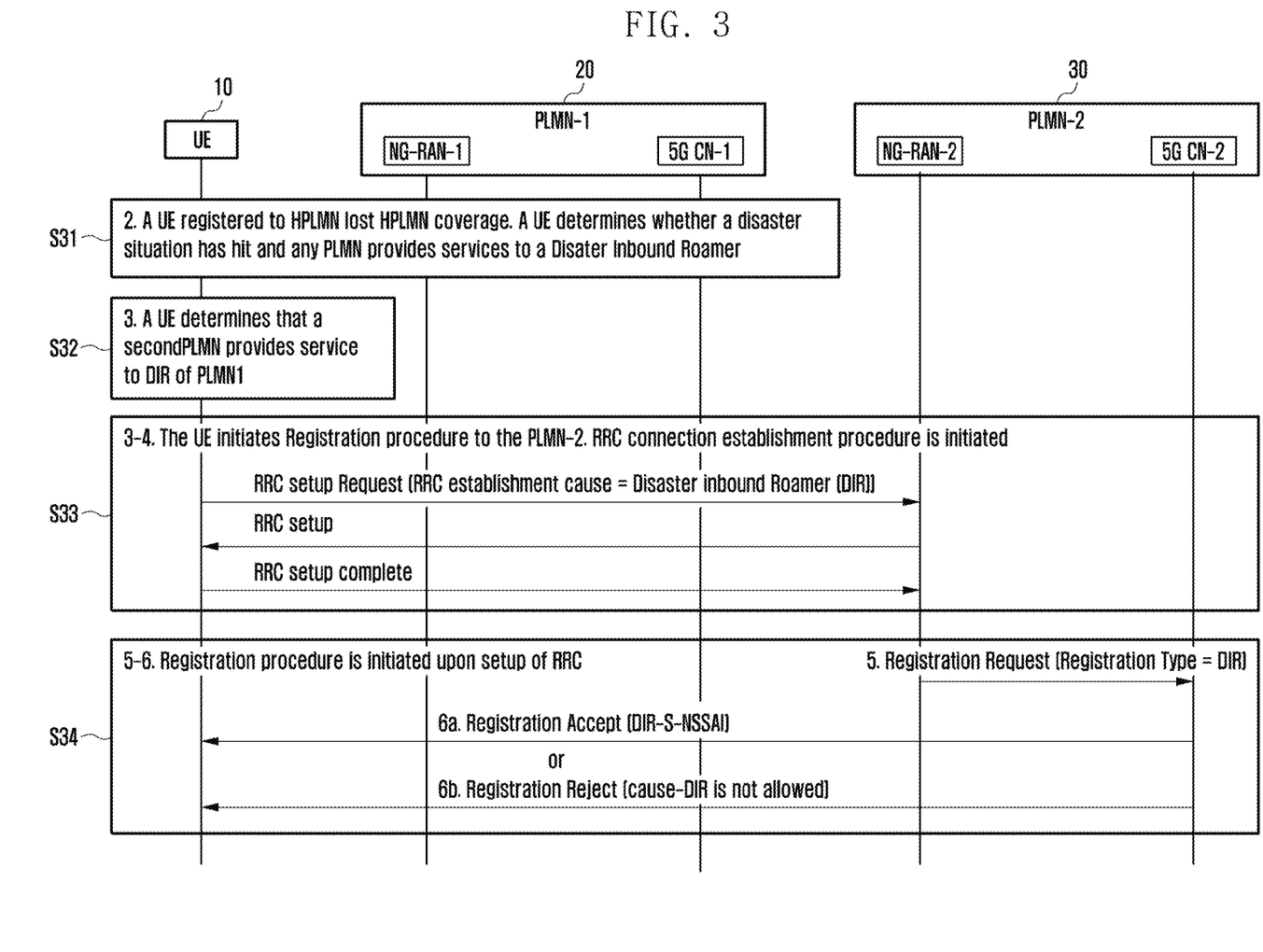
FIG. 3 illustrates a typical message exchange according to a third embodiment of the present invention.
Figure 4:
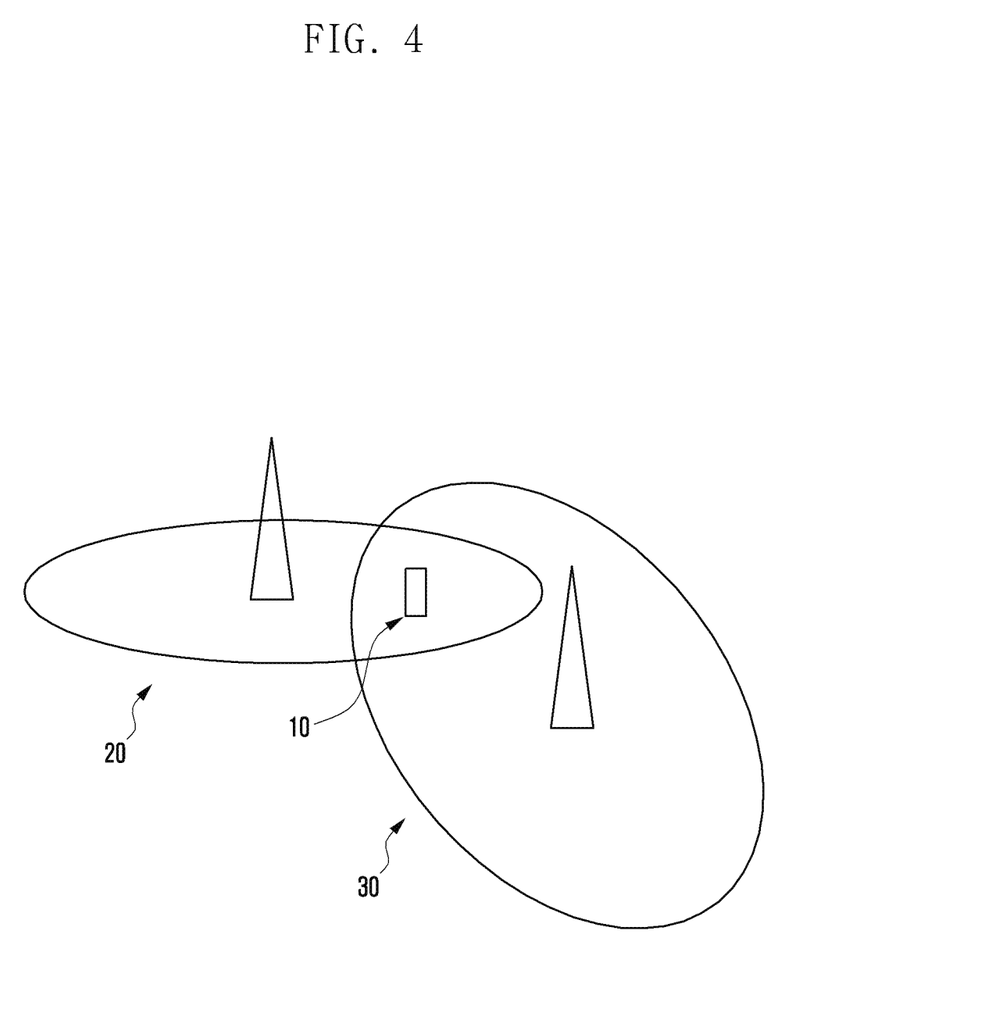
FIG. 4 illustrates, for the sake of completeness, the UE 10 which is positioned within the coverage area for both PLMN1 20 and PLMN2 30.

For a better understanding of the invention, and to show how embodiments of the same may be carried into effect, reference will now be made, by way of example only, to the accompanying diagrammatic drawings in which:

FIGS. 1 to 3 represent signalling exchanges between a UE and first and second PLMNs according to embodiments of the present invention; and FIG. 4 illustrates a schematic representation of two PLMNs and a UE in the context of embodiments of the present invention.

FIG. 1 illustrates a typical message exchange according to a first embodiment of the present invention. Here, a new network slice is defined for a disaster inbound roamer. In one embodiment, a new standardised value is defined for slice/service type for disaster or a new value is defined for a slice differentiator (SD) for a particular slice and service type (SST) to identify the inbound disaster roamers requesting a service for a particular SST.

In more detail, and by reference to FIG. 1, the following steps are performed between one or more of UE 10, PLMN1 20 and PLMN2 30. At step S11, a network slice, handling disaster inbound roamers (DIR), is defined by PLMN2 30. At step S12 a UE registered to its home network loses coverage. The UE determines whether a disaster situation has occurred and whether at any other PLMN providers are providing a service to disaster inbound roamers.

In order to determine that a disaster has occurred, there is a two-step process. Firstly, the UE 10 becomes unable to communicate with its home PLMN1 20. This, in itself, is not a completely unheard-of event and could, ordinarily, be due to being in a coverage blackspot, for instance, In order for this to qualify as a disaster a second step is required. This second step is the reception from another PLMN (in this case, PLMN2 30) which effectively broadcasts a message indicating that roamers from other disaster-affected networks are welcome to register with it.

The message from PLMN2 30 may comprise a general message effectively saying, "all incoming roamers are welcome" or it may be more specific and say "incoming roamers from PLMN1 20 are welcome". In either event, the two step process is that the UE 10 must lose contact with its home PLMN1 20 and receive a "welcome" message from PLMN2 30.

The broadcast message from PLMN2 30 does not need to be broadcast in each and every cell of PLMN2 30. Rather, it only needs to be transmitted in cells which are in the same or similar geographic location as the cells of PLMN1 20 affected by the disaster. Of course, if the disaster affects all the cells of PLMN1 20, then the message can be broadcast by PLMN2 30 as widely as is required.

In general, UEs do not pay attention to broadcast messages from PLMNs with which they are not registered. However, in the context of DIR, then a UE does receive and process messages from other (non-Home) PLMNs which are configured to welcome DIRs.

In the normal course of events, a UE is unable to roam onto a network in its home state as this feature is only typically used for international travel, where there is no pre-existing relationship with a foreign network. However, in a disaster scenario, where a PLMN advertises its ability to accept DIRs, then such domestic roaming is no longer forbidden.

At step S13 the UE determines that a second PLMN 30 is providing service to disaster inbound roamers, originally registered with PLMN1 20. At step S14, the UE initiates registration with PLMN2 30. This involves the usual RRC connection establishment procedure (DIR-S-NSSAI) between the UE 10 and PLMN2 30. As part of this process, the UE communicates with a base station (NG-RAN-2) of PLMN2 30 which forwards the registration request to the core network (5G-CN2) of PLMN2 30.

At step S15, the Access and Mobility management Function (AMF) of PLMN2 30 performs a network slice selection procedure to select the 5G core network related to DIR-S-NSSAI. After the network slice selection procedure, the network 30 completes the registration procedure by means of a message from PLMN2 30 to UE 10.

At step S16, PLMN2 30 applies a Unified Access Control (UAC) mechanism for DIR to UE 10. By means of a UAC procedure, PLMN2 30 is able to control access to its network and so ensure that it is not overwhelmed by incoming disaster roamers. The use of UAC is defined in TS 22.261, clause 6.22 "Unified Access Control". Embodiments of the present invention hereby define a specific class for UAC such that incoming disaster inbound roamers may be controlled. Such a class allows any UEs having this class to be barred from PLMN2 30. PLMN2 30 sends an access control message with the assigned access category set to the assigned number and it affects the UEs that are disaster inbound roamers. The category is defined in TS 22.011 (category 3) as a "UE for which disaster condition applied".

The use of this facility does not suppress all UEs associated with that level. Instead, "access class barring" sends a threshold value (e.g. 0.71). The UE 10 then generates a random number and if this generated random number is lower than the threshold value received, then the UE is barred from access. In this way, by setting the threshold and communicating it to UEs seeking access, the network is able to bar access to a selected number of prospective inbound roamers. To put this another way, the network is bale to limit access to a define number of inbound roamers, such that its network is not overwhelmed.

In relation to FIG. 1, two examples of S-NSSAI related to DIR are:

| Slice/Service type | SST value | Characteristics |
|---|---|---|
| Disaster Inbound Roamer | Integer | Slice suitable for handling disaster inbound roamer |
| eMBB | Disaster Inbound Roamer (Integer) | Slice suitable for the handling of 5G enhanced Mobile Broadband for disaster inbound roamer |

FIG. 2 illustrates a typical message exchange according to a second embodiment of the present invention. Here, a new Access identity for a Disaster Inbound Roamer is defined and a UAC mechanism is used to perform the access control for the DIR. The new access identity is herein termed Disaster Inbound Roamer Identity (DIRI). Further, an access category is defined for the DIRI. See step S21.

A UE 10 of a first network determines that the coverage of the first network 20 is lost, in the same two-step manner as described previously. In response to losing this coverage of the first network, the UE determines whether any other network 30 can provide service to the subscriber of the first network 20. See step S22.

The UE 10 determines that a second PLMN 30 provides service to the first PLMN 20 in a disaster situation. In one example, the second PLMN 30 broadcasts information in SIB-n that it provides a service to the subscriber of the first PLMN 20 in this disaster situation. The UE 10 determines whether the second PLMN 30 provides a service to the first PLMN 20 in this disaster situation by reading and checking the information that is broadcast. the second PLMN 30 also broadcasts information related to the rate at which the disaster inbound roamers are allowed into the second PLMN 30 using the UAC mechanism. See step S23.

After the UE 10 determines that the second PLMN 30 provides a service to the subscriber of the first PLMN 20 in the disaster situation, then the UE 10 camps on a cell of the second PLMN 30 and initiates registration procedure. The UE 10 performs access checks for the DIR. If the UE 10 passes the access check then the UE establishes the RRC connection and, during the RRC connection procedure, the UE may send DIRI in an RRC message (e.g. RRCsetupRequest). After the establishment of the RRC connection, the UE sends a Registration Request message. The UE may contain DIRI in the Registration Request message. See step S24.

When the NG-RAN of PLMN2 30 or the AMF receives DIRI in the RRC message during the RRC connection establishment procedure or in a Registration Request message, the NG-RAN of PLMN2 30 may determine whether to establish N1 signalling or not depending on available network resources. In one example, if the level of available resource is relatively low, the NG-RAN may reject or release the RRC connection, indicating that resources are not available to the UE 10. The AMF may reject the Registration procedure by sending a Registration Reject message with an appropriate cause value indicating the resources are not available. See step S25.

When the UE 10 receives the RRC message or the Registration Reject message containing the cause value indicating the registration procedure has failed due to resources not being available, then the UE 10 may attempt registration procedure after some time, for example, by means of a network supplied back-off timer range, directing the UE 10 to wait the signalled duration before the next attempt. Alternatively, the UE may select a different (e.g. third) PLMN not shown), which provides a roaming service to a subscriber of the first PLMN in a disaster situation.

FIG. 3 illustrates a typical message exchange according to a third embodiment of the present invention. Here, a new Registration Type is defined for a DIR.

A UE 10 (subscriber) of a first PLMN 20 determines that the coverage of the first PLMN 20 is lost. In response of the losing coverage of the first PLMN, the UE determines whether any PLMN can provide a service to the subscriber of the first PLMN. See step S31.

The UE 10 determines a second PLMN 30 provides a service to the subscriber of the first PLMN 20 in a disaster situation. In one example, the second PLMN 30 broadcasts information in SIB-n that it provides service to the subscriber of the first PLMN 20 in the disaster situation. The UE 10 determines whether the second PLMN 30 provides services to the first PLMN 20 in the disaster situation by reading and checking the broadcast information. The second PLMN 30 also broadcasts information concerning the rate at which the Disaster Inbound Roamers are allowed into the second PLMN 30 using UAC mechanism. See step S32

After the UE 10 determines that the second PLMN 30 provides a service to the subscriber of the first PLMN 20 in the disaster situation, then the UE 10 camps on a cell of the second PLMN 30 and initiates a registration procedure. The UE 10 sends RRCsetupRequest containing "RRC establishment cause=disaster inbound roamer". See step S33

When the NG-RAN of PLMN2 30 receives a RRCSetupRequest with the RRC establishment cause, the NG-RAN may prioritize the RRC connection establishment depending on the received RRC establishment cause. For example, if the NG-RAN has a relatively low level of available resource then it may not accept the RRC connection establishment related to Disaster Inbound Roamer. However, at the same time, the NG-RAN may accept the RRC connection establishment for high priority UEs or home subscribers. The NG-RAN may establish the RRC connection. See step S33

After the RRC connection is established the UE sends Registration Request message containing an Information Element (IE) indicating the registration is for DIR. In one example a new registration type contains a value indicating registration procedure for DIR. See step S34

The AMF, based on the information IE (e.g. Registration type), determines that the Registration Request message is for a DIR. The AMF may determine whether to accept the Registration Request or reject it depending on the network resource available. If the network resource is available and the services offered to home subscribers of the second PLMN 30 are not substantially impacted, than the second PLMN 30 accepts the registration request and proceeds with the registration procedure. If the resources are not available or services offered to the home subscribers are substantially affected, then the AMF may reject the Registration procedure by sending a Registration Reject message with an appropriate cause value indicating the resources are not available. See step S34.

When the UE 10 receives the RRC message or the Registration Reject message containing the cause value indicating that the registration procedure has failed due to resources not being available at the PLMN 30, then the UE 10 may attempt a further registration procedure after some time. Alternatively, the UE 10 may select a third PLMN (not shown), which provides a roaming service to a subscriber of the first PLMN 20.

FIG. 4 illustrates, for the sake of completeness, the UE 10 which is positioned within the coverage area for both PLMN1 20 and PLMN2 30. In the event that a disaster affects PLMN1 20, as set out, such that at least the cell in which UE 10 becomes inoperative, the UE 10 is, according to an embodiment of the present invention, able to gain access, as a DIR, to PLMN2 30.

Figure 5:
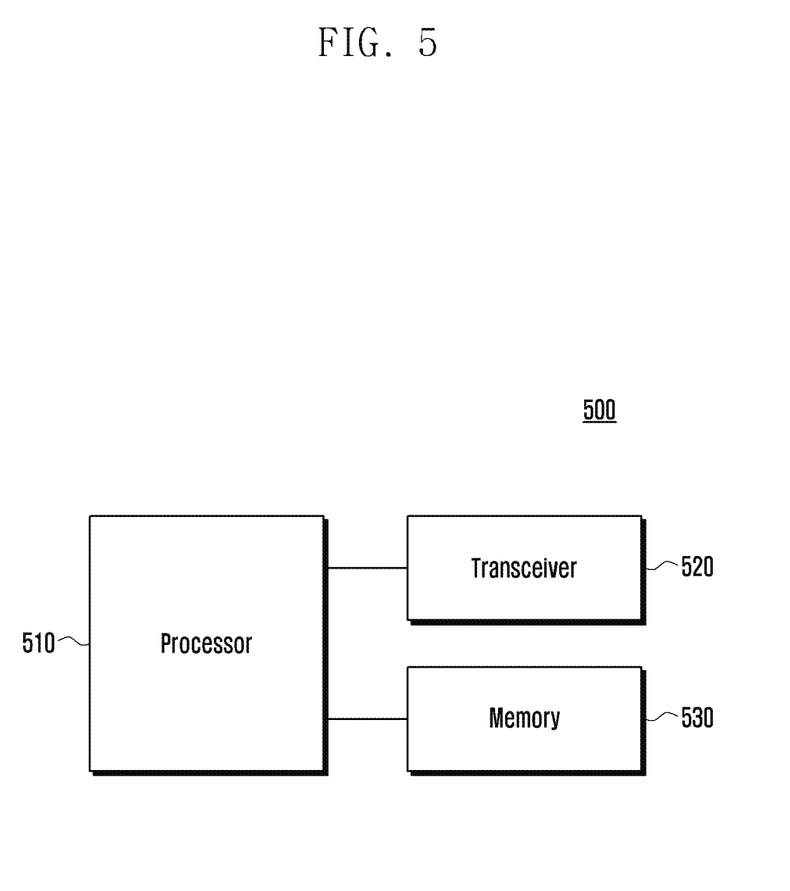
FIG. 5 illustrates a block diagram of a base station (BS) according to embodiments of the present disclosure.

FIG. 5 illustrates a block diagram of a base station (BS) according to embodiments of the present disclosure.

Referring to the FIG. 5, the BS 500 may include a processor 510, a transceiver 520 and a memory 530. However, all of the illustrated components are not essential. The BS 500 may be implemented by more or less components than those illustrated in FIG. 5. In addition, the processor 510 and the transceiver 520 and the memory 530 may be implemented as a single chip according to another embodiment.

The aforementioned components will now be described in detail.

The processor 510 may include one or more processors or other processing devices that control the proposed function, process, and/or method. Operation of the BS 500 may be implemented by the processor 510.

In one embodiment, the processor 510 may map PRS to Resource Elements (REs) of a frame structure and transmit the frame structure such that the power used to transmit REs containing PRS is higher than the power used to transmit REs not containing PRS.

The transceiver 520 may include a RF transmitter for up-converting and amplifying a transmitted signal, and a RF receiver for down-converting a frequency of a received signal. However, according to another embodiment, the transceiver 520 may be implemented by more or less components than those illustrated in components.

The transceiver 500 may be connected to the processor 510 and transmit and/or receive a signal. The signal may include control information and data. In addition, the transceiver 520 may receive the signal through a wireless channel and output the signal to the processor 510. The transceiver 520 may transmit a signal output from the processor 510 through the wireless channel.

The memory 530 may store the control information or the data included in a signal obtained by the BS 500. The memory 530 may be connected to the processor 510 and store at least one instruction or a protocol or a parameter for the proposed function, process, and/or method. The memory 530 may include read-only memory (ROM) and/or random access memory (RAM) and/or hard disk and/or CD-ROM and/or DVD and/or other storage devices.

Figure 6:
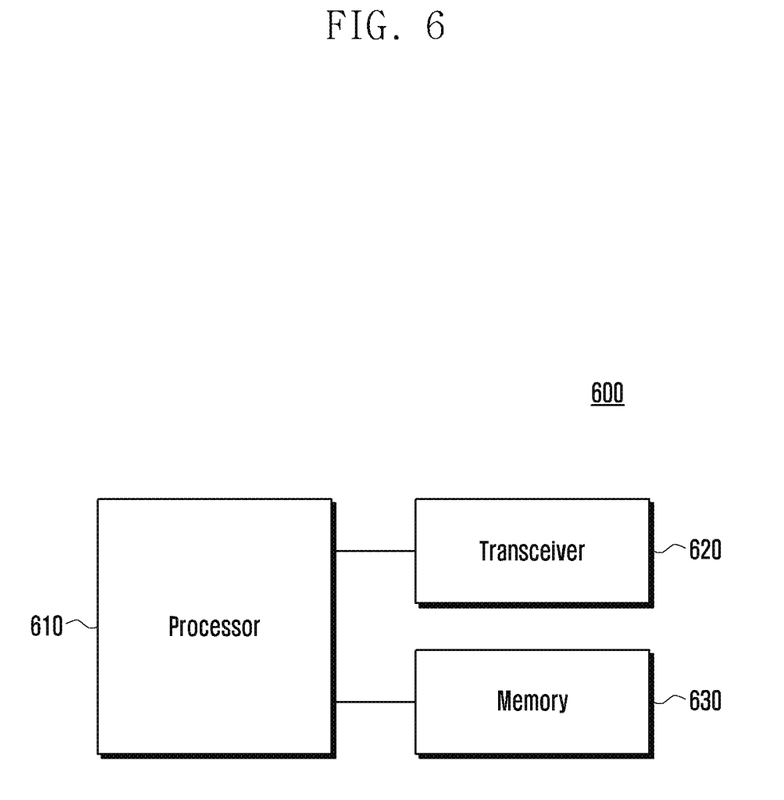
FIG. 6 illustrates a user equipment (UE) according to embodiments of the present disclosure.

FIG. 6 illustrates a user equipment (UE) according to embodiments of the present disclosure.

Referring to the FIG. 6, the UE 600 may include a processor 610, a transceiver 620 and a memory 630. However, all of the illustrated components are not essential. The UE 600 may be implemented by more or less components than those illustrated in FIG. 6. In addition, the processor 610 and the transceiver 620 and the memory 630 may be implemented as a single chip according to another embodiment.

The aforementioned components will now be described in detail.

The processor 610 may include one or more processors or other processing devices that control the proposed function, process, and/or method. Operation of the UE 600 may be implemented by the processor 610.

In one embodiment, the processor 610 may measure the signal strength from one or more base stations and transmit PRS with a power determined based on the measurements.

In one embodiment, the processor 610 may receive signaling from a base station and transmit PRS with a power determined based on the signaling.

The transceiver 620 may include a RF transmitter for up-converting and amplifying a transmitted signal, and a RF receiver for down-converting a frequency of a received signal. However, according to another embodiment, the transceiver 620 may be implemented by more or less components than those illustrated in components.

The transceiver 620 may be connected to the processor 610 and transmit and/or receive a signal. The signal may include control information and data. In addition, the transceiver 620 may receive the signal through a wireless channel and output the signal to the processor 610. The transceiver 620 may transmit a signal output from the processor 610 through the wireless channel.

The memory 630 may store the control information or the data included in a signal obtained by the UE 600. The memory 630 may be connected to the processor 610 and store at least one instruction or a protocol or a parameter for the proposed function, process, and/or method. The memory 630 may include read-only memory (ROM) and/or random access memory (RAM) and/or hard disk and/or CD-ROM and/or DVD and/or other storage devices.

Certain examples of the present disclosure may be provided in the form of a base station (e.g. gNB) and/or method therefore. Certain examples of the present disclosure may be provided in the form of a mobile device (e.g. UE) and/or method therefore. Certain examples of the present disclosure may be provided in the form of a system comprising one or more base stations and one or more mobile devices, and/or method therefore.

The embodiments described herein may be implemented using any suitably configured apparatus and/or system. Such an apparatus and/or system may be configured to perform a method according to any aspect, embodiment, example or claim disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation of X may be performed by a module configured to perform X (or an X-module). The one or more elements may be implemented in the form of hardware, software, or any combination of hardware and software.

The skilled person will appreciate that a given process, operation and/or method step disclosed herein may be performed by a single entity (hardware and/or software), or the performance of such a process, operation and/or method step may be distributed and performed by two or more entities in cooperation. The skilled person will also appreciate that a single entity (hardware and/or software) may be configured to perform one process, operation and/or method step disclosed herein, or may be configured to perform two or more such processes, operations and/or method steps.

It will be appreciated that examples of the present disclosure may be implemented in the form of hardware, software or any combination of hardware and software. Any such software may be stored in the form of volatile or non-volatile storage, for example a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like.

It will be appreciated that the storage devices and storage media are embodiments of machine-readable storage that are suitable for storing a program or programs comprising instructions that, when executed, implement certain examples of the present disclosure. Accordingly, certain example provide a program comprising code for implementing a method, apparatus or system according to any example, embodiment, aspect and/or claim disclosed herein, and/or a machine-readable storage storing such a program. Still further, such programs may be conveyed electronically via any medium, for example a communication signal carried over a wired or wireless connection.

The above flowcharts and flow diagrams illustrate examples of methods and processes that can be implemented in accordance with the principles of the present disclosure and various changes could be made to the methods and processes illustrated in the flowcharts and flow diagrams. For example, while shown as a series of steps, various steps in each figure could overlap, occur in parallel, occur in a different order, or occur multiple times. In another example, steps may be omitted or replaced by other steps.

Although the present disclosure has been described with an exemplary embodiment, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined only by the claims FIG. 7 illustrates a block diagram of a core network entity according to embodiments of the present disclosure.

Figure 7:
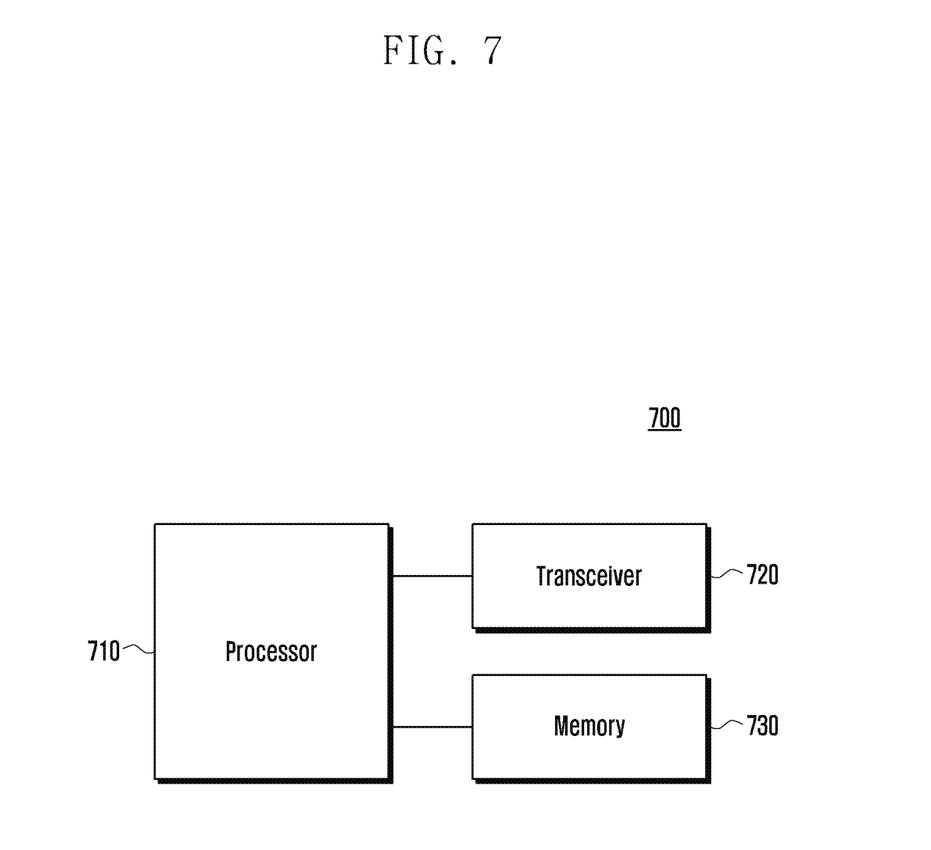
FIG. 7 illustrates a block diagram of a core network entity according to embodiments of the present disclosure.

Referring to the FIG. 7, the core network entity 700 may include a processor 710, a transceiver 720 and a memory 730. However, all of the illustrated components are not essential. The core network entity 700 may be implemented by more or less components than those illustrated in FIG. 7. In addition, the processor 710 and the transceiver 720 and the memory 730 may be implemented as a single chip according to another embodiment.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a terminal in a wireless communication system, the method comprising:
   identifying that the terminal loses coverage in a first public land mobile network (PLMN);
   receiving, from a base station related to a second PLMN, a broadcast message indicating that the second PLMN is accessible for disaster inbound roamers;
   based on the broadcast message, determining the second PLMN for a disaster roaming, wherein the second PLMN is one of PLMNs configured to be used in a disaster condition; and
   initiating a registration procedure on the second PLMN,
   wherein whether the second PLMN is allowed to access is determined based on a random number generated by the terminal and a unified access control (UAC) barring threshold value for an access for the disaster roaming received from the second base station.

2. The method of claim 1, wherein the access for the disaster roaming corresponds to an access identity 3.

3. The method of claim 1, wherein the registration procedure on the second PLMN is initiated after a waiting timer expires.

4. The method of claim 1, wherein the initiating of the registration procedure on the second PLMN comprises transmitting, to the base station, a registration request message including a registration type which indicates that the registration procedure is for the disaster roaming.

5. A terminal in a wireless communication system, the terminal comprising:
   a transceiver; and
   a controller coupled with the transceiver and configured to:
      identify that the terminal loses coverage in a first public land mobile network (PLMN),
      receive, from a base station related to a second PLMN, a broadcast message indicating that the second PLMN is accessible for disaster inbound roamers,
      based on the broadcast message, determine the second PLMN for a disaster roaming, wherein the second PLMN is one of PLMNs configured to be used in a disaster condition, and
      initiating a registration procedure on the second PLMN,
   wherein whether the second PLMN is allowed to access is determined based on a random number generated by the terminal and a unified access control (UAC) barring threshold value for an access for the disaster roaming received from the second base station.

6. The terminal of claim 5, wherein the access for the disaster roaming corresponds to an access identity 3.

7. The terminal of claim 5, wherein the registration procedure on the second PLMN is initiated after a waiting timer expires.

8. The terminal of claim 5, wherein the controller is further configured to transmit, to the base station, a registration request message including a registration type which indicates that the registration procedure is for the disaster roaming.

* * * * *